(12) United States Patent
Mak et al.

(10) Patent No.: US 11,145,981 B2
(45) Date of Patent: Oct. 12, 2021

(54) WIRE IDENTIFICATION SENSOR

(71) Applicant: The Government of the United States, as represented by the Secretary of the Army, Washington, DC (US)

(72) Inventors: Bing Mak, Marlboro, NJ (US); Adam Melber, Churchville, MD (US); Daniel Heinz, Perry Hall, MD (US); Michael Brennan, North East, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 295 days.

(21) Appl. No.: 16/174,344

(22) Filed: Oct. 30, 2018

(65) Prior Publication Data

US 2019/0131708 A1     May 2, 2019

Related U.S. Application Data

(60) Provisional application No. 62/578,596, filed on Oct. 30, 2017.

(51) Int. Cl.
*H01Q 7/00*     (2006.01)

(52) U.S. Cl.
CPC ..................... *H01Q 7/00* (2013.01)

(58) Field of Classification Search
CPC ............... G01V 3/10; G01V 3/28; H01Q 7/00
See application file for complete search history.

(56) References Cited

U.S. PATENT DOCUMENTS

| | | | |
|---|---|---|---|
| 5,583,523 A * | 12/1996 | Wallace, Jr. | ........... H01Q 1/247 343/700 MS |
| 9,651,703 B2 | 5/2017 | Heinz et al. | |
| 9,791,585 B2 | 10/2017 | Heinz et al. | |
| 9,971,055 B2 | 5/2018 | Heinz et al. | |
| 10,078,147 B2 | 9/2018 | Heinz et al. | |
| 2016/0018552 A1* | 1/2016 | Heinz | ...................... G01V 3/10 324/329 |

* cited by examiner

*Primary Examiner* — Hasan Islam
(74) *Attorney, Agent, or Firm* — Ronald Krosky

(57) ABSTRACT

Various embodiments that pertain to a loop antenna are described. The loop antenna can be a single loop antenna that switches between a first phase and a second phase. While operating at different phases, the loop antenna can function at the same frequency. The loop antenna can observe a response to the frequency at the first phase and the frequency at the second phase. This can provide a wider range of information over operation in a single phase.

16 Claims, 10 Drawing Sheets

WIRE IDENTIFICATION SENSOR

CROSS-REFERENCE

This application claims priority to U.S. Provisional Patent Application No. 62/578,596 filed on Oct. 30, 2017. The entirety of U.S. Provisional Patent Application No. 62/578,596 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Detectors, such as metal detectors, can be used in a variety of fields. In one example, a hobbyist can comb a beach searching for lost coins and to aid in this search the hobbyist can employ a metal detector. Use of the metal detector can allow the hobbyist to determine if there is merit in uncovering an area of sand. The more accurate the metal detector, the more efficient the searching can be.

SUMMARY

In one embodiment, a system comprises a single loop antenna. The system also comprises a hardware switch set. The hardware switch set can be configured to cause the single loop antenna to operate at a frequency and a first phase during a first time and operate at the frequency and a second phase during a second time.

In another embodiment, a method can comprise controlling a single loop antenna to be in a first stage during a first period of time and controlling the single loop antenna to be in a second stage during a second period of time. The first stage can be the single loop antenna emitting at a frequency with a first phase and the second stage can be the second stage is the single loop antenna emitting at the frequency with a second phase. The first phase and second phase can be about opposite of one another.

In yet another embodiment, a method can comprise identifying a first response to an excitement produced by a single loop antenna operating at a frequency with a first phase and identifying a second response to an excitement produced by the single loop antenna operating at the frequency with a second phase. The method can also comprise comparing the first response to the second response such that a comparison result is produced. The method can additionally comprise outputting the comparison result.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
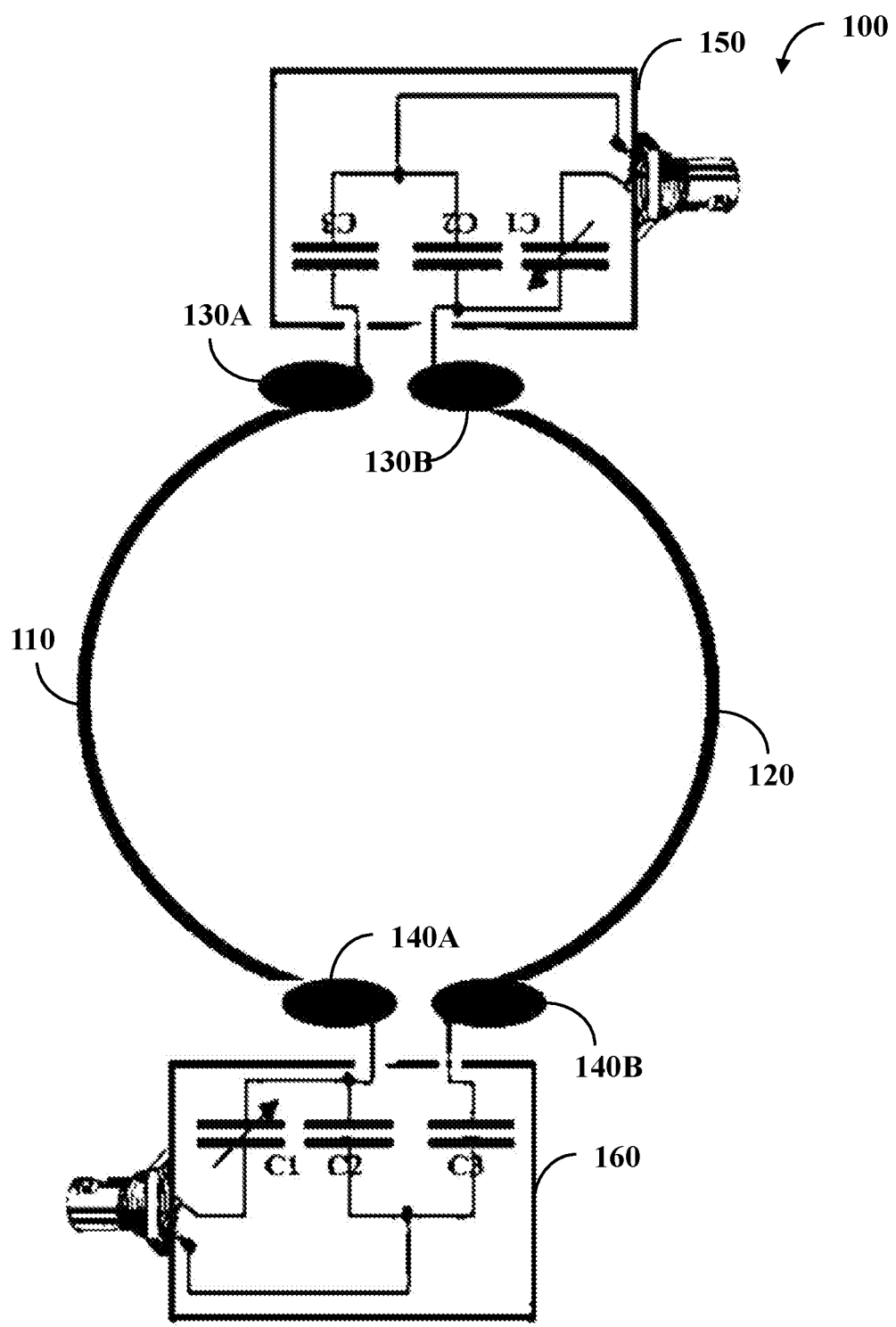
FIG. 1 illustrates one embodiment of a system comprising a first loop portion, a second loop portion, a first relay, a second relay, and two energy circuits.

A single loop antenna can be used to emit at the same frequency, but at two different phases. In one example, a first emission can occur at 0° and a second emission can occur at 180°. The responses from these emission can be compared against one another to determine if a metal or other object exists (such as a wire) and therefore function as an identification sensor.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a first loop portion 110, a second loop portion 120, a first relay 130 (with portions 130A and 130B), a second relay 140 (with portions 140A and 140B), and two energy circuits 150 and 160. The two loop portions 110 and 120 can form a single loop antenna. The relays 130 and 140 can function as a hardware switch set configured to cause the single loop antenna to operate at a frequency and a first phase during a first time and operate at the frequency and a second phase during a second time.

In one embodiment, the first portion 110 and second portion 120 can be of about 180 degrees and therefore be functionality a first half and a second half, respectively, that form a continuously loop due to the energy circuits 150-160 (e.g., when the energy circuits 150-160 include the relays 130-140). The energy circuit 150 can couple to a first end of the loop, such as couple to the relay portions 130A and 130B and the energy circuit 160 can couple to a second end of the loop, such as couple to the relay 140A and 140B. With this, the energy circuit 150 can be a first energy circuit coupled to a first end of the first half and a first end of the second half and the energy circuit 160 can be a second energy circuit coupled to a second end of the first half and a second end of the second half. The first energy circuit and the second energy circuit can be configured to energize the single loop antenna.

To achieve this, the circuits 150 and 160 can alternate operation. In one example, relay 130 can work with the energy circuit 150 and the relay 140 can work with the energy circuit 160. The relay 130 can function as a first relay set configured to control interaction of the first energy circuit 150 with the first end (top) of the first half 110 and the first end (top) of the second half 120. Similarly, the relay 140 can function as a second relay set that controls interaction of the second energy circuit 160 with the second end (bottom) of the first half 110 and the second end (bottom) of the second half 120.

The antenna loop with the first half 110 and second half 120 can function with a single frequency, while alternating phases. In one example, during a first time period, the antenna loop operates at a phase of 0° and during a second time period, the antenna loop operates at a phase of 180° (opposite the first phase). The antenna loop can alternate between these at the same frequency (e.g., 12 Megahertz (MHz) or 24 MHz). To achieve this, in one embodiment, during the first time period, the relay 130 can cause the circuit 150 to function as a short while the relay 140 can cause the circuit 160 to energize the halves 110 and 120 and during the second time period, the relay 140 can cause the circuit 160 to function as a short while the relay 130 can cause the circuit 160 to energize the halves 110 and 120.

The loop antenna can be directed towards a ground and under normal conditions the energizing can cause the ground to respond consistently (e.g., soil and stand can provide the same response to multiple iterations of an emission of the frequency at the first phase and the second phase). The loop antenna can be configured to observe this response. Similarly, when a non-uniformity is present (e.g. a coin is located under the sand), then the response can be different (e.g., a first emission at the frequency and the first phase is different from a second emission at the frequency and the first phase or the first emission at the frequency and the first phase is different from a first emission at the frequency and a second phase). The loop antenna can be configured to observe a first response from an excitement caused by operation of the single loop antenna at the frequency and the first phase and configured to observe a second response from an excitement caused by operation of the single loop antenna at the frequency and the second phase. The circuits 150 and/or 160, as well as a separate unit (e.g., a Vector Network Analyzer) can process the responses.

While illustrates as a dual loop with the first portion 110 and the second portion 120, other configurations can be implemented. In one embodiment, the loop antenna can function with signal and ground paths corresponding to four portion of the relays 130A, 130B, 140A, and 140B and circuits 150 and 160. The hardware switch set can be configured to cause the loop antenna to operate at the frequency and a third phase during a third time and operate at the frequency and a fourth phase during a fourth time (e.g. first time, then second time, then third time, then fourth time, then first time again, and so on). In one example, this of a 90 degree offset, the first phase is 0°, the second phase is 90°, the third phase is 180°, and the fourth phase is 270°. Other offsets can be used, such as a 120° offset with three portions or a 45° offset with eight portions.

Figure 2:
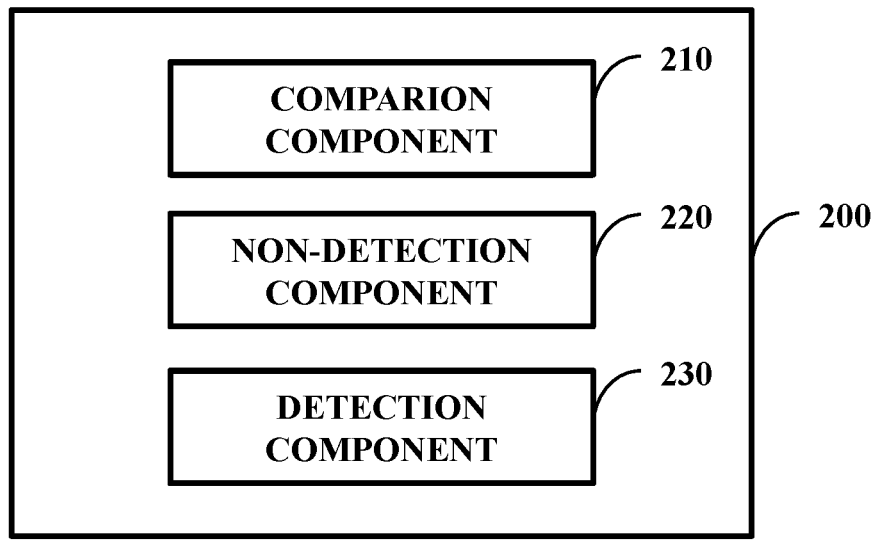
FIG. 2 illustrates one embodiment of a system comprising a comparison component, a non-detection component, and a detection component.

FIG. 2 illustrates one embodiment of a system 200 comprising a comparison component 210, a non-detection component 220, and a detection component 230. The comparison component 210 can be configured to produce a comparison result from comparison of the first response (excitement from the single loop operating at the frequency with the first phase) with the second response (excitement from the single loop operating at the frequency with the second phase). The non-detection component 220 can be configured to declare a non-detection when the comparison result is equal to about zero (no difference between responses) and the detection component 230 can be configured to declare a detection when the comparison result is not equal to about zero (there is a difference between responses).

Functioning at two different phases can give twice an amount of information (albeit with half the sample size). An object can respond at 180°, but not 0°. If only 0° is emitted, then the object might not be missed by a searcher. Comparison of the two against one another can indicate that the object exists. The non-detection and detection components 220 and 230 can work together—if the object is detected, then a notice can be generated and outputted (e.g., a light flashes and a buzzer sounds).

Figure 3:
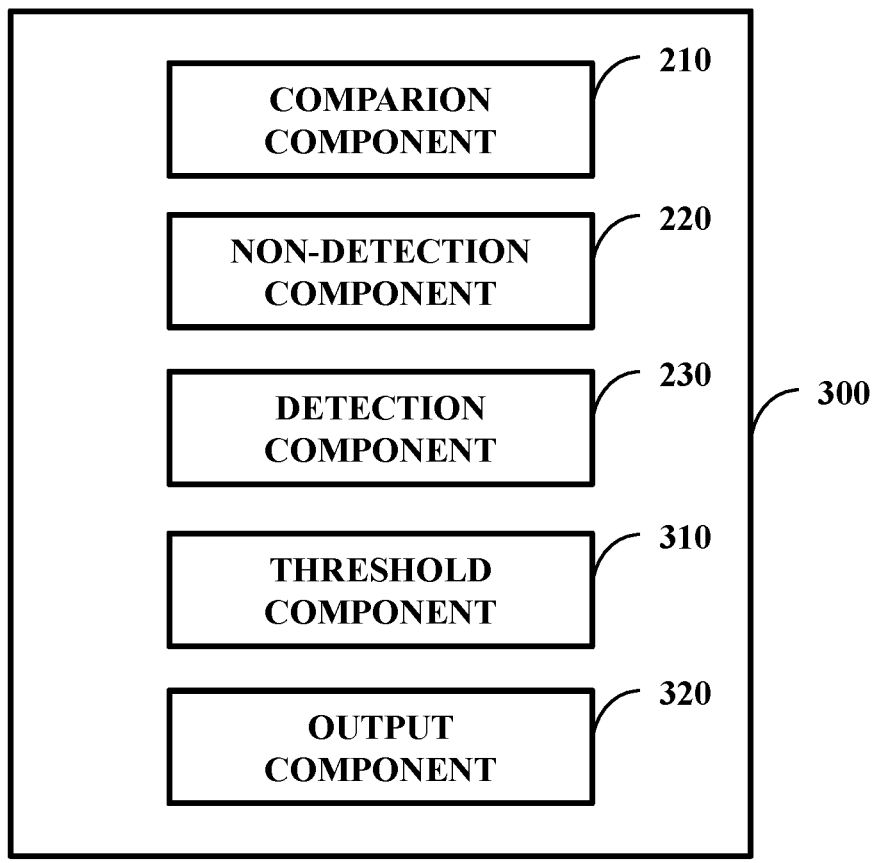
FIG. 3 illustrates one embodiment of a system comprising the comparison component, the non-detection component, the detection component, a threshold component, and an output component.

FIG. 3 illustrates one embodiment of a system 300 comprising the comparison component 210, the non-detection component 220, the detection component 230, a threshold component 310, and an output component 320. The threshold component 310 can be configured to evaluate the comparison result against a threshold to produce an evaluation result. The output component 320 can be configured to cause a notice to be outputted when the threshold component indicates that the comparison result meets the threshold.

In one example, the loop antenna can include a light and buzzer for output of the notice. The loop antenna can be employed on soil by a person looking for something buried by a dog. While the soil can be relatively consistent, small variations can exist in the soil. If the light and buzzer sounded every time an extremely small object was detected, then the loop antenna could become functionally useless. Therefore, a certain threshold can be used to determine if the detection is worthy of notification. With this, if there is too small of a difference between the first response and the second response, then a notice is not generated.

Other features can be practiced to improve accuracy of the loop antenna. In one embodiment, a selection component can select a value of the frequency based, at least in part, on achieving accuracy. In one embodiment, the loop antenna can be mounted on a vehicle. The selection component can select length of the first time period and the second time period, such as with them being about equal, based, at least in part, on a speed of the vehicle. In an example of this, the faster the vehicle travels, the shorter the time period length can be. Additionally, vehicle speed can influence selection of the frequency switching value.

Figure 4:
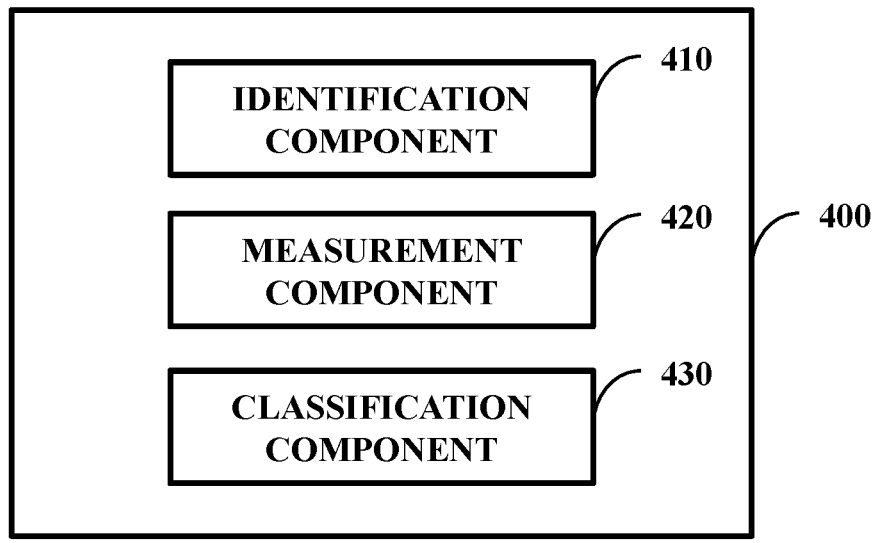
FIG. 4 illustrates one embodiment of a system comprising an identification component, a measurement component, and a classification component.

FIG. 4 illustrates one embodiment of a system 400 comprising an identification component 410, a measurement component 420, and a classification component 430. The identification component 410 can be configured to identify if the response is to the first phase or if the response is to the second phase. In one example, the selection component can select the time period to be long enough such that the excitement is perceived within the time period. Therefore, the identification component 410 can identify what emission occurs during transmission.

The measurement component 420 can be configured to measure a magnitude of the response. The classification component configured to classify a presumed object indicated by the response, with the classification being based, at least in part, on the magnitude and on the phase. The output component 320 of FIG. 3 can output an indication of a classification. In one example, for a classification of 'tin' a green light can illuminate while for a classification of 'ferrite' a yellow light can illuminate.

Figure 5:
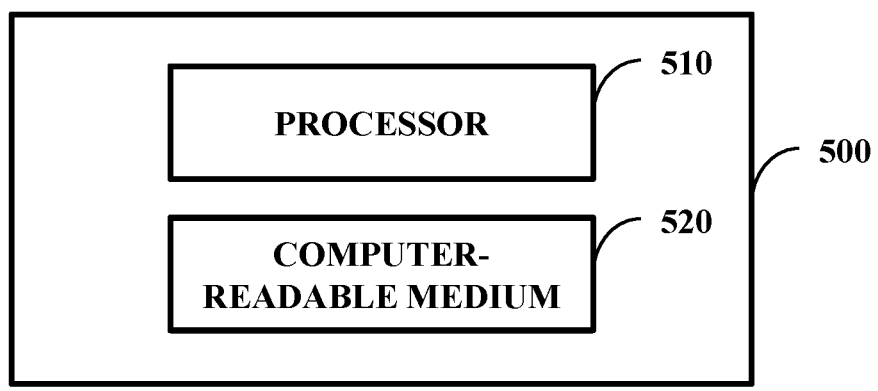
FIG. 5 illustrates one embodiment of a system comprising a processor and a computer-readable medium.

FIG. 5 illustrates one embodiment of a system 500 comprising a processor 510 and a computer-readable medium 520 (e.g., non-transitory computer-readable medium). The processor 510 and/or the computer-readable medium 520 can function as part of the Vector Network Analyzer. In one embodiment, the computer-readable medium 520 is communicatively coupled to the processor 510 and stores a command set executable by the processor 510 to facilitate operation of at least one component disclosed herein (e.g., the output component 320 of FIG. 3 and/or the identification component 410 of FIG. 4). In one embodiment, at least one component disclosed herein (e.g., the comparison component 210 of FIG. 2 and/or the measurement component 420 of FIG. 4) can be implemented, at least in part, by way of non-software, such as implemented as hardware by way of the system 500. In one embodiment, the computer-readable medium 520 is configured to store processor-executable instructions that when executed by the processor 510, cause the processor 510 to perform at least part of a method disclosed herein (e.g., at least part of one of the methods 600-1000 discussed below).

Figure 6:
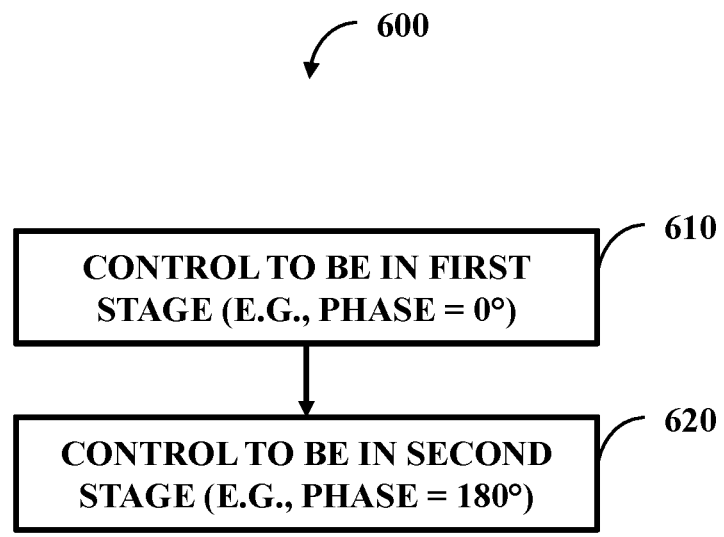
FIG. 6 illustrates one embodiment of a method comprising two actions.

FIG. 6 illustrates one embodiment of a method 600 comprising two actions 610-620. At 610, controlling a single loop antenna to be in a first stage during a first period of time can occur. An example of the first stage can be the single loop antenna functioning at 12 MHz at a phase of 0°. This can be achieved by engaging a first energizing circuit and shorting a second energizing circuit (e.g., energizing the circuit 150 of FIG. 1 and shorting the circuit 160 of FIG. 1)

At 620, there can be controlling the single loop antenna to be in a second stage during a second period of time that is consecutive and non-overlapping with the first time. An example of the second stage can be the single loop antenna functioning at 12 MHz at a phase of 180°. This can be achieved by engaging a first energizing circuit and shorting a second energizing circuit (e.g., energizing the circuit 150 of FIG. 1 and shorting the circuit 160 of FIG. 1)

Figure 7:
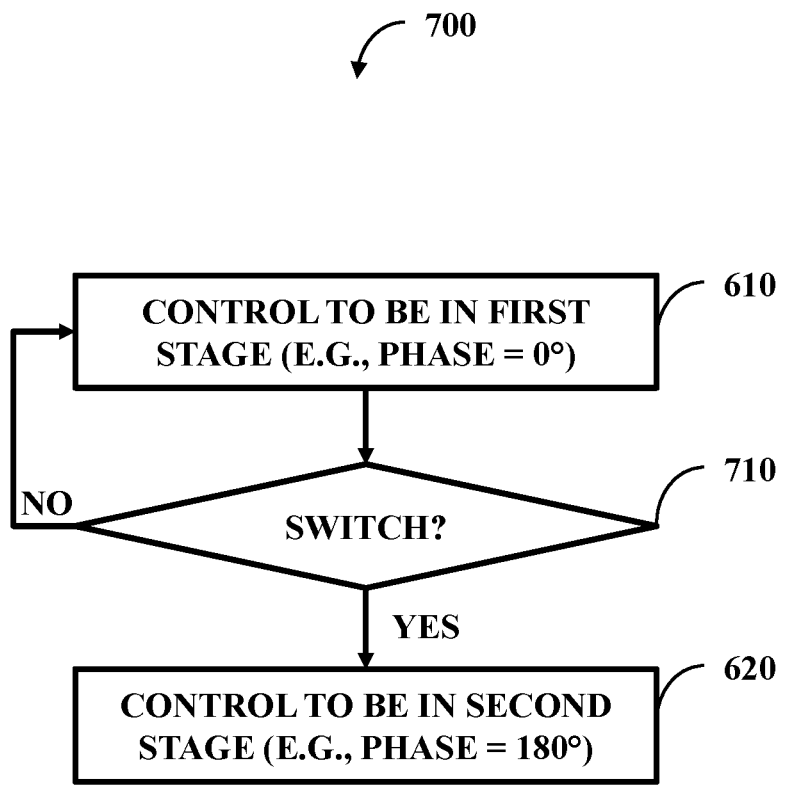
FIG. 7 illustrates one embodiment of a method comprising three actions.

FIG. 7 illustrates one embodiment of a method 700 comprising three actions 610-620 and 710. The first stage can begin at 610. At 710, a check can occurring identifying an end to the first period of time and determining if the second stage should begin. In one embodiment, the check 710 can be can be implemented by way of a timer. If the check determine that it is not time to switch, then the single loop antenna can continue in the first phase. However, if it is identified that the first period of time has ended, then controlling the single loop antenna to be in the second stage can occur at 620. Other features can be practiced, such as doing the same for the second phase and when it is done returning to the first phase or determining when to stop operation (e.g., in response to a command to stop operation).

Figure 8:
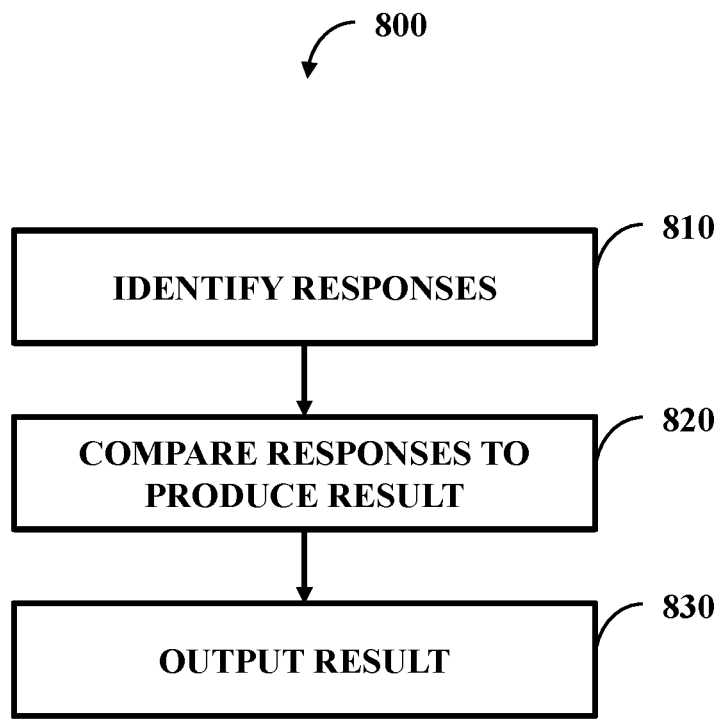
FIG. 8 illustrates one embodiment of a method comprising three actions.

FIG. 8 illustrates one embodiment of a method 800 comprising three actions 810-830. At 810, there can be identifying a first response to an excitement produced by the single loop antenna operating at a frequency with a first phase and identifying a second response to an excitement produced by the single loop antenna operating at the frequency with a second phase (e.g., 180 degrees opposite the first phase). The response can be at least one actual response (e.g., magnitude with an absolute value greater than zero) or a zero response (e.g., no excitement) that is still a response. At 820 comparing the first response to the second response such that a comparison result is produced can occur. At 830, the comparison result can be outputted, such as outputted to the processor 510 of FIG. 5 for analysis.

Figure 9:
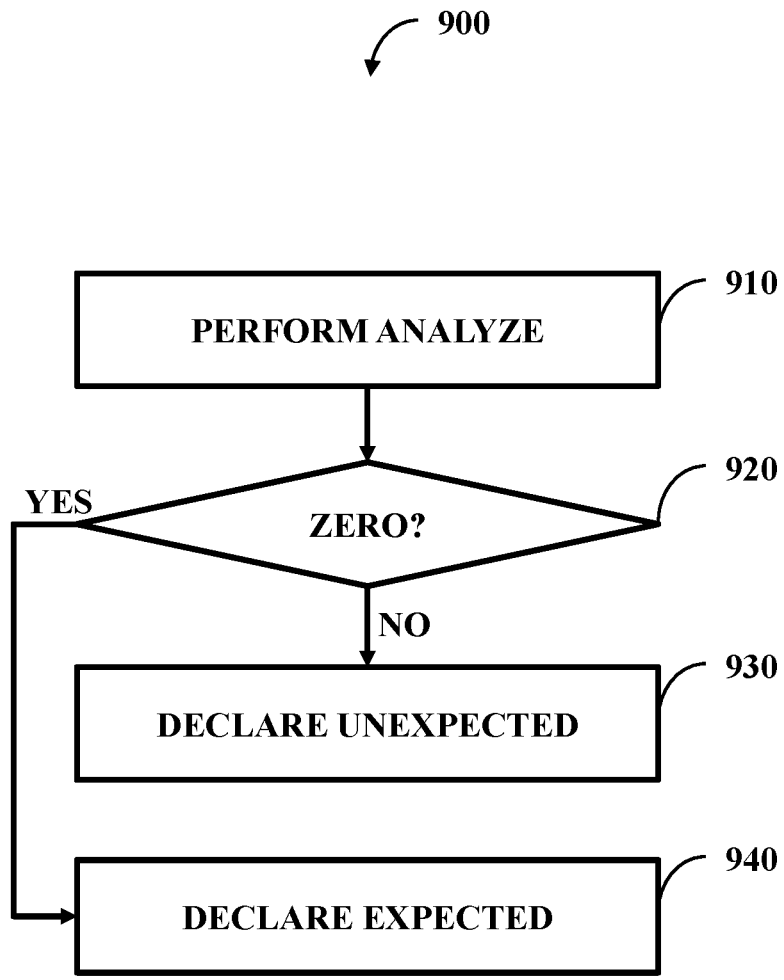
FIG. 9 illustrates one embodiment of a method comprising four actions.

FIG. 9 illustrates one embodiment of a method 900 comprising four actions 910-940. The actions 910-940 can be a processing of the result outputted at 830 of FIG. 8. At 910, analyzing the comparison result to determine if a difference between the first response and the second response is about zero can occur. A check can occur at 920 if the difference is zero. If the difference is not about zero, then a declaration can be made at 930 (e.g., a buzzer is sounded) that an unexpected object does exist If the difference is about zero, then a declaration can be made at 940 that the unexpected object does not exist (e.g., the buzzer is not sounded).

In one embodiment, a check can occur to determine even if the value is zero that the declaration can be that the unexpected object does exist. A material may cause the same magnitude response despite the change in phase. Therefore, the comparison would result in a zero. To prevent the false positive, a check can occur to determine if the magnitudes are zero—if both are zero, then the expected designation occurs (e.g., it is expected for the object to not be there as a default). If either magnitude is not zero, then declaration is that the unexpected object is found and a notice can be outputted indicating as such.

As part of the analysis of action 910, a classification can be determined. In one example, if the check 920 determines that there is a difference, then the method 900 can return to 910 for further analysis. As part of this further analysis, there can be determining a classification the unexpected object based, at least in part, on the comparison result. In one example of this, the check 920 can determine if the comparison result is zero or not. If the value is not zero, then the method 900 can return to the analysis action at 910 to determine a magnitude and what phase produced the nonzero result. A look-up table can be consulted to determine what material best matches the phase and magnitude. This best match can be caused to be outputted and further analyzed. This further analysis can include analyzing the classification to decide if a notice should be outputting indicative of the existence of the unexpected object. In one example, if the classification is of a wire, then a notice can be caused to be outputted, but if a ferrite material is detected, then no notice is caused to be outputted.

Figure 10:
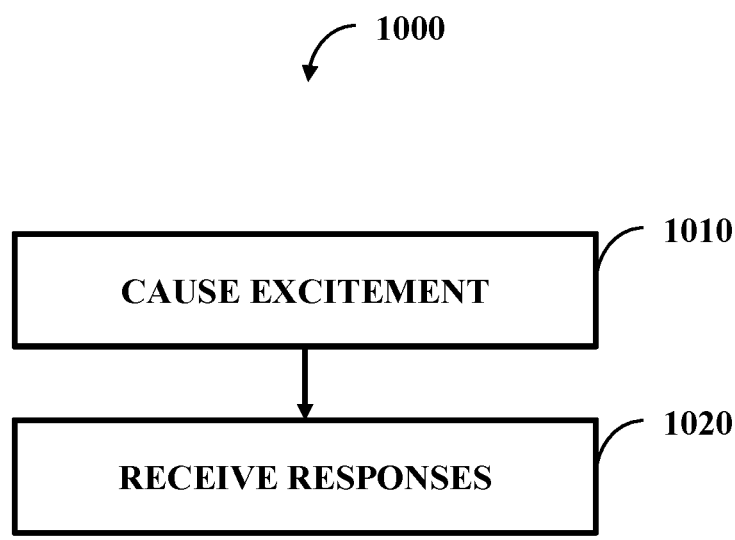
FIG. 10 illustrates one embodiment of a method comprising two actions.

FIG. 10 illustrates one embodiment of a method 1000 comprising two actions 1010-1020. At 1010, there is causing the single loop antenna to produce the excitation at the frequency with the first phase during a first time period and causing the single loop antenna to produce the excitation at the frequency with the second phase (e.g., 180 degrees different from the first phase) during the second time period separate and distinct from the first time period. At 1020, the response can be received as part of the identification of 810 of FIG. 8.

While the methods disclosed herein are shown and described as a series of blocks, it is to be appreciated by one of ordinary skill in the art that the methods are not restricted by the order of the blocks, as some blocks can take place in different orders.

What is claimed is:

1. A system, comprising:
  a single loop antenna that comprises a first half of about 180 degrees and a second half of about 180 degrees; and
  a hardware switch set that causes the single loop antenna to operate at a frequency and a first phase during a first time and operate at the frequency and a second phase during a second time,
  where the hardware switch set comprises a first energy circuit coupled to a first end of the first half and a first end of the second half, and
  where the hardware switch set comprises a second energy circuit coupled to a second end of the first half and a second end of the second half,
  where the first energy circuit is to energize the single loop antenna,
  where the second energy circuit is to energize the single loop antenna,
  where the first energy circuit, the second energy circuit, the first half, the second half form a continuous loop.

2. The system of claim 1, comprising:
  a first relay set to control interaction of the first energy circuit with the first end of the first half and the first end of the second half; and
  a second relay set to control interaction of the second energy circuit with the second end of the first half and the second end of the second half,
  where the first relay set and second relay set cause the first energy circuit to energize the first half and the second half during the first time,
  where the first relay set and second relay set cause the second energy circuit to short the first half and the second half during the first time,
  where the first relay set and second relay set cause the second energy circuit to energize the first half and the second half during the second time, and
  where the first relay set and second relay set cause the first energy circuit to short the first half and the second half during the second time.

3. The system of claim 2,
  where the first phase and the second phase are about opposite one another and
  where the first time and the second time are about consecutive.

4. The system of claim 3,
  where the single loop antenna is configured to observe a first response from an excitement caused by operation of the single loop antenna at the frequency and the first phase and
  where the single loop antenna is configured to observe a second response from an excitement caused by operation of the single loop antenna at the frequency and the second phase.

5. The system of claim 4, comprising:
  a comparison component to produce a comparison result from comparison of the first response with the second response,
  a non-detection component to declare a non-detection when the comparison result is equal to about zero; and
  a detection component to declare a detection when the comparison result is not equal to about zero.

6. The system of claim 5, comprising:
  a threshold component to evaluate the comparison result against a threshold to produce an evaluation result; and
  an output component to cause a notice to be outputted when the threshold component indicates that the comparison result meets the threshold.

7. The system of claim 6, where the single loop antenna is to receive a response, comprising:
  an identification component to identify if the response is to the first phase or if the response is to the second phase; and
  a measurement component to measure a magnitude of the response; and
  a classification component to classify a presumed object indicated by the response,
  where the classification is based, at least in part, on the magnitude and on if the response is to the first phase or the second phase and
  where an indicator of the classification is outputted.

8. The system of claim 7, comprising:
  a selection component to select a value of the frequency, a length of the first time, and a length of the second time,
  where the single loop antenna is mounted on a vehicle,
  where the selection of the value of the frequency is based, at least in part, on a speed of the vehicle when the hardware switch set causes the single loop antenna to operate,
  where the selection of the length of the first time is based, at least in part, on the speed of the vehicle when the hardware switch set causes the single loop antenna to operate, and
  where the selection of the length of the second time is based, at least in part, on the speed of the vehicle when the hardware switch set causes the single loop antenna to operate, and
  where the length of the first time and the length of the second time are about equal.

9. The system of claim 7,
  where the hardware switch set is configured to cause the single loop antenna to operate at the frequency and the first phase during a third time, and
  where the third time directly follows the second time.

10. A system comprising:
a single loop antenna to receive a response;
a hardware switch set to cause the single loop antenna to operate at a frequency and a first phase during a first time and operate at the frequency and a second phase during a second time;
an identification component to identify if the response is to the first phase or if the response is to the second phase; and
a measurement component to measure a magnitude of the response; and
a classification component to classify a presumed object indicated by the response,
where the hardware switch set is to cause the single loop antenna to operate at the frequency and the first phase during a third time,
where the first phase and the second phase are about opposite one another,
where the second time directly follows the first time,
where the third time directly follows the second time,
where the classification is based, at least in part, on the magnitude and on if the response is to the first phase or the second phase, and
where an indicator of the classification is outputted.

11. A system, comprising:
a single loop antenna;
a hardware switch set to cause the single loop antenna to operate at a frequency and a first phase during a first time and operate at the frequency and a second phase during a second time; and
a selection component to select a value of the frequency,
where the hardware switch set is to cause the single loop antenna to operate at the frequency and the first phase during a third time,
where the first phase and the second phase are about opposite one another,
where the second time directly follows the first time,
where the third time directly follows the second time,
where the single loop antenna is mounted on a vehicle, and
where the selection is based, at least in part, on a speed of the vehicle when the hardware switch set causes the single loop antenna to operate.

12. A system, comprising:
a single loop antenna;
a hardware switch set to cause the single loop antenna to operate at a frequency and a first phase during a first time and operate at the frequency and a second phase during a second time; and
a selection component to select a value of the frequency, a length of the first time, and a length of the second time,
where the single loop antenna is mounted on a vehicle,
where the selection of the value of the frequency is based, at least in part, on a speed of the vehicle when the hardware switch set causes the single loop antenna to operate,
where the selection of the length of the first time is based, at least in part, on the speed of the vehicle when the hardware switch set causes the single loop antenna to operate, and
where the selection of the length of the second time is based, at least in part, on the speed of the vehicle when the hardware switch set causes the single loop antenna to operate.

13. A system, comprising:
a single loop antenna to receive a response;
a hardware switch set to cause the single loop antenna to operate at a frequency and a first phase during a first time and operate at the frequency and a second phase during a second time;
an identification component to identify if the response is to the first phase or if the response is to the second phase;
a measurement component to measure a magnitude of the response; and
a classification component to classify a presumed object indicated by the response,
where the classification is based, at least in part, on the magnitude and on if the response is to the first phase or the second phase, and
where an indicator of the classification is outputted,
where the hardware switch set is to cause the single loop antenna to operate at the frequency and the first phase during a third time,
where the first phase and the second phase are about opposite one another,
where the second time directly follows the first time, and
where the third time directly follows the second time.

14. A system, comprising:
a single loop antenna to receive a response;
a hardware switch set to cause the single loop antenna to operate at a frequency and a first phase during a first time and operate at the frequency and a second phase during a second time;
where the hardware switch set is to cause the single loop antenna to operate at the frequency and a third phase during a third time and operate at the frequency and a fourth phase during a fourth time,
where the second time follows the first time,
where the third time follows the second time,
where the fourth time follows the third time,
where the second phase is about 90 degrees offset from the first phase,
where the third phase is about 180 degrees offset from the first phase,
where the fourth phase is about 270 degrees offset from the first phase;
an identification component to identify if the response is to the first phase, the second phase, the third phase, or the fourth phase;
a measurement component to measure a magnitude of the response; and
a classification component to classify a presumed object indicated by the response,
where the classification is based, at least in part, on the magnitude and on if the response is to the first phase, the second phase, the third phase, or the fourth phase, and
where an indicator of the classification is outputted.

15. The system of claim 14, comprising
a comparison component to produce a comparison result set from comparison of the first response with the second response, comparison of the first response with the third response, comparison of the first response with the fourth response, comparison of the second response with the third response, comparison of the second response with the fourth response, and comparison of the third response with the fourth response;
a non-detection component to declare a non-detection when the comparison result set is equal to about zero; and
a detection component to declare a detection when the comparison result is not equal to about zero.

16. The system of claim 15, comprising:
a threshold component to evaluate the comparison result set against a threshold to produce an evaluation result; and
an output component to cause a notice to be outputted when the threshold component indicates that the comparison result meets the threshold.

\* \* \* \* \*